May 19, 1925.
W. F. MARSHALL
TOOL HOLDER
Filed Sept. 26, 1923
1,537,957
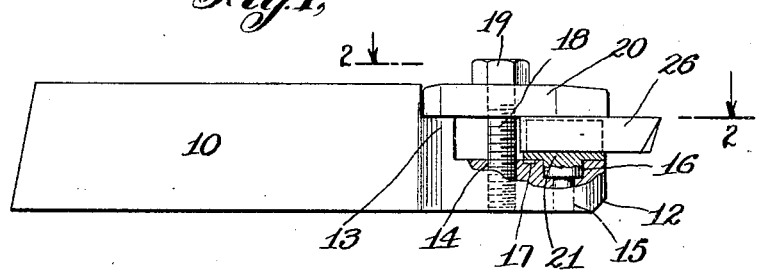
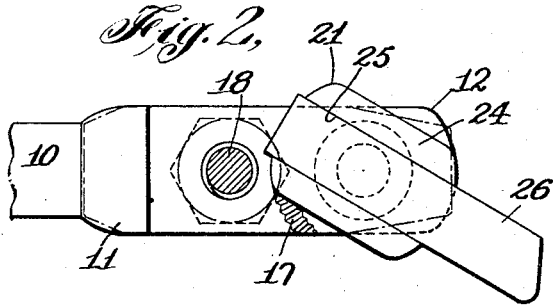
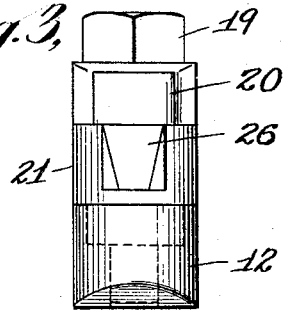
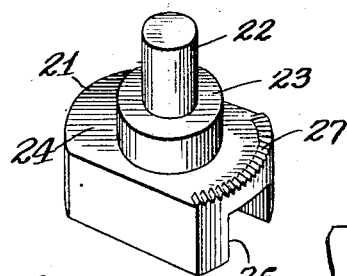
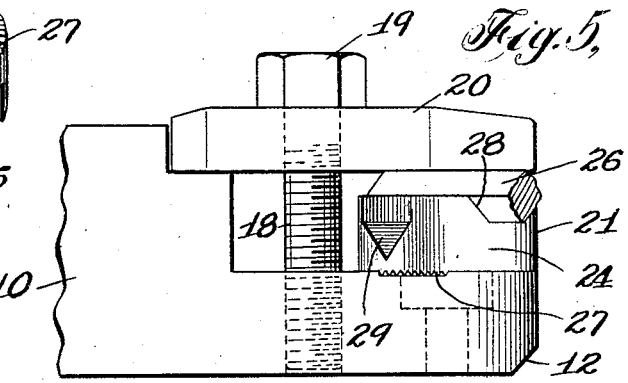
INVENTOR
William F. Marshall
BY
Howard E. Thompson
ATTORNEY Patented May 19, 1925.

1,537,957

UNITED STATES PATENT OFFICE.

WILLIAM F. MARSHALL, OF NEW YORK, N. Y.

TOOL HOLDER.

Application filed September 26, 1923. Serial No. 664,891.

*To all whom it may concern:*

Be it known that I, WILLIAM F. MARSHALL, a citizen of the United States, and residing at New York, in the county of New York and State of New York, have invented certain new and useful Improvements in Tool Holders, of which the following is a specification, such as will enable those skilled in the art to which it appertains to make and use the same.

This invention relates to tool holders and particularly to devices of this class designed to be used in connection with lathes or other turning machines; and the object of the invention is to provide a holder of the class specified which by reason of its construction will permit of the mounting of tools of predetermined shapes, sizes and forms in the tool holder in different angular positions with reference to the longitudinal plane of the shank of the holder; a further object being to provide means for positively retaining the tool holding devices employed against lateral or other movement in the holder proper; a still further object being to provide means for quickly attaching and detaching the tools to be used in connection with the holder, thus facilitating the use of the tools and the mounting thereof in the machine or the tool holding stock of the machine; and with these and other objects in view, the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a side view of my improved tool holding device showing a tool supported therein and with part of the construction broken away and in section.

Fig. 2 is a sectional view on the line 2—2 of Fig. 1 on an enlarged scale and with parts in a different position.

Fig. 3 is an edge view of the construction shown in Fig. 1 and on an enlarged scale.

Fig. 4 is a perspective view of a part of the construction shown in Figs. 1 to 3 inclusive; and Fig. 5 is a view similar to Fig. 2 but showing a modified form of construction.

In Figs. 1 to 4 inclusive, I have shown at 10 an elongated bar which is rectangular in form in cross section and which constitutes the shank of my improved tool holding device, said bar being adapted to be inserted into the usual tool post or stock of a lathe or similar machine. The bar 10 is enlarged at one end as shown at 11 and the top face thereof is cut out to form an extension 12 of considerably less vertical dimensions than the bar 10 and also to form a shoulder portion 13.

Substantially centrally of the extension 12 is a threaded aperture 14 outwardly of which is another aperture 15 enlarged at its upper end as shown at 16, and circumferentially around the aperture 15 or the enlargement 16 thereof the top face of the extension 12 is provided with a plurality of radially arranged teeth 17 clearly shown in Fig. 2 of the drawing.

In threaded engagement with the aperture 14 is a screw 18 and freely mounted on said screw beneath the head 19 thereof is a clamp arm 20 which rests on the shoulder 13 as clearly shown in the drawing.

A tool supporting member 21 is rotatably mounted in the aperture 15, said member being provided with a projecting trunnion 22 which extends into said aperture and with an enlarged collar portion 23 which fits in the enlargement 16 of the aperture 15, and the head 24 of the member 21 is enlarged and substantially cylindrical in form and provided in the top face thereof with an elongated groove 25, which opens through the opposite walls of the head 24, and in this groove a tool 26 is adapted to be placed, the shank of the tool being substantially of the same transverse dimensions as the aperture or groove 25. The lower face of the head 24 at one side thereof is provided with circumferentially arranged and radially extending teeth or projections 27 which correspond with and are adapted to mesh with the teeth 17 on the extension 12, it being understood that the teeth 17 are cut in the face of said extension while the teeth 27 project beyond the bottom face of the head 24.

With my improved construction, it will be understood that the member 21 or the head 24 thereof may be placed in any angular position with reference to the longitudinal plane of the bar 10 and will be locked or retained against lateral movement by the interlocking or meshing of the teeth 17 and 27. In other words, the groove or aperture 25 may be so positioned as to extend the tool 26 at an angle to the shank of the holder, one position of which is shown in Fig. 2 of the drawing. In mounting a tool in the holder, a member 21 with a shank construction such as 22—23 is selected, having a predetermined groove or aperture 25 formed therein, and this member is mounted upon the extension 12 as shown in Fig. 1 when the clamp arm 20 is in a position at right angles to that shown in Fig. 1 or when the same has been removed, after which the clamp arm and screw are placed in position and the screw 19 tightened to firmly grasp the tool 26 placed in the member 21 in any desired position of adjustment. With this construction, any kind or class of tool and size of tool, within certain limits, may be mounted in connection with the tool holder by employing a corresponding member 21 provided with a recess or aperture 25 to suit the shank of the tool.

In Fig. 5 of the drawing, I have shown a modified form of member 21 in which the head 24 is provided with grooves or apertures 28 and 29 extending at right angles to each other across the top face of the head, and these grooves or apertures are of different dimensions and may be of different form, and with this construction the head 24 is preferably cylindrical in form rather than being provided with flattened or cut away sides as shown in Fig. 4, but the operation and use of the tool of the member 21 shown in Fig. 5 will be the same as that shown in Figs. 1 to 3 inclusive. From the foregoing, it will be apparent that the distinctive feature of my invention resides in the use of the member 21 which constitutes the tool holding member proper, with means on said member and cooperating with the stock or body portion of the tool for retaining the same in predetermined position of adjustment, and with other means for retaining the tool and said member against movement, and while I have shown certain details of construction for carrying my invention into effect, it will be understood that I am not necessarily limited to these details and various changes therein and modifications thereof may be made within the scope of the appended claims without departing from the spirit of my invention or sacrificing its advantages.

Having fully described my invention, what I claim as new and desire to secure by Letters Patent, is:—

1. A device of the class described comprising a bar, one end portion of which is provided with an extension of less vertical dimensions than said bar, said extension being provided with an aperture, a member adapted to be placed on said extension and provided with a part extending into said aperture and rotatable therein, interlocking means on said extension and said member for retaining the member in predetermined position of adjustment, said member being fashioned to receive a predetermined tool, and means for retaining said member and tool against movement relatively to said bar and the extension thereof.

2. A device of the class described comprising a bar, one end portion of which is provided with an extension of less vertical dimensions than said bar, said extension being provided with an aperture, a member adapted to be placed on said extension and provided with a part extending into said aperture and rotatable therein, interlocking means on said extension and said member for retaining the member in predetermined position of adjustment, said member being fashioned to receive a predetermined tool, means for retaining said member and tool against movement relatively to said bar and the extension thereof, said last named means comprising a screw in threaded engagement with said extension, and a clamp arm freely mounted on said screw.

3. A device of the class described comprising a body portion, the shank of which is fashioned to permit of its insertion into the tool post of a suitable machine, the head of said body portion being enlarged laterally and reduced vertically, said head being provided with a threaded aperture adapted to receive a screw, a clamp arm freely mounted on said screw and adapted to be moved into operative position by the head of said screw, a tool supporting member rotatably adjustable in said head forwardly of the screw mounted therein whereby a tool supported in said member may be positioned in the plane of the body portion or at an angle thereto, and said tool and member being retained in predetermined position of adjustment by said clamp arm.

4. A device of the class described comprising a body portion, the shank of which is fashioned to permit of its insertion into the tool post of a suitable machine, a member rotatably adjustable relatively to the body portion, said member being fashioned to receive and support a suitable tool, and a clamp mounted in connection with the body portion independent of said member and adapted to cooperate with a tool supported in said member for retaining said tool and said member in predetermined positions.

5. A device of the class described comprising a body portion provided with a suitable shank, a member rotatably adjustable in said body portion, said member being fashioned to receive and support a suitable tool, a clamp block, means for adjustably supporting said block in connection with said body portion, said means being in spaced relation with said member, and said clamp block cooperating with the body portion and a tool supported in said member for retaining the tool and said member in predetermined position.

6. In a tool of the class described, a tool supporting member comprising a head portion, a pin extending from one face of said head portion, and said head portion being provided upon the opposite face thereof with a groove extending through the side walls thereof, said groove being of predetermined form in cross section.

7. In a tool of the class described, a tool supporting member comprising a head portion, a pin extending from one face of said head portion, said head portion being provided upon the opposite face thereof with a groove extending through the side walls thereof, said groove being of predetermined form in cross section, and a plurality of teeth or projections formed on the first named face of said head portion in a circumferential path with reference to the axis of said pin.

In testimony that I claim the foregoing as my invention I have signed my name this 24 day of September, 1923.

WILLIAM F. MARSHALL.